US010043004B2

(12) United States Patent
Cornell et al.

(10) Patent No.: US 10,043,004 B2
(45) Date of Patent: *Aug. 7, 2018

(54) METHOD OF CORRELATING STATIC AND DYNAMIC APPLICATION SECURITY TESTING RESULTS FOR A WEB AND MOBILE APPLICATION

(71) Applicant: Denim Group, Ltd., San Antonio, TX (US)

(72) Inventors: Dan Cornell, San Antonio, TX (US); Mac Collins, San Antonio, TX (US)

(73) Assignee: Denim Group, Ltd., San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/687,186

(22) Filed: Aug. 25, 2017

(65) Prior Publication Data

US 2018/0025154 A1 Jan. 25, 2018

Related U.S. Application Data

(63) Continuation-in-part of application No. 15/011,817, filed on Feb. 1, 2016.

(60) Provisional application No. 62/117,670, filed on Feb. 18, 2015, provisional application No. 62/110,117, filed on Jan. 30, 2015.

(51) Int. Cl.
*G06F 21/56* (2013.01)
*G06F 21/55* (2013.01)
*G06F 21/57* (2013.01)

(52) U.S. Cl.
CPC .......... *G06F 21/552* (2013.01); *G06F 21/563* (2013.01); *G06F 21/566* (2013.01); *G06F 21/577* (2013.01); *G06F 2221/033* (2013.01)

(58) Field of Classification Search
None
See application file for complete search history.

(56) References Cited

U.S. PATENT DOCUMENTS

| 8,225,405 B1* | 7/2012 | Peterson ............... H04L 63/205 713/187 |
| 9,507,943 B1 | 11/2016 | Allen |
| 9,525,698 B2 | 12/2016 | Crosby et al. |
| 2012/0210434 A1 | 8/2012 | Curtis et al. |
| 2013/0014260 A1* | 1/2013 | Lee ...................... G06F 21/564 726/24 |
| 2013/0091541 A1 | 4/2013 | Beskrovny et al. |
| 2013/0185797 A1* | 7/2013 | Zhou ...................... G06F 21/52 726/23 |
| 2013/0227695 A1 | 8/2013 | Shankar |
| 2014/0068768 A1* | 3/2014 | Lospinuso ............ G06F 21/562 726/23 |

(Continued)

FOREIGN PATENT DOCUMENTS

WO 2016113663 A1 7/2016

*Primary Examiner* — Malcolm Cribbs
(74) *Attorney, Agent, or Firm* — Gunn, Lee & Cave, PC (57) ABSTRACT

The invention provides a method of correlating and merging static application security testing (SAST) and dynamic application security testing (DAST) for web and mobile applications. The invention provides a method for categorizing and comparing various endpoint objects including the path (i.e., location within the application's attack surface), one or more parameters, an HTTPMethod, a filename on the file system, line number, and mobile entry point.

12 Claims, 10 Drawing Sheets

(56) References Cited

U.S. PATENT DOCUMENTS

2015/0309813 A1 10/2015 Patel
2016/0191550 A1 6/2016 Ismael et al.

* cited by examiner

METHOD OF CORRELATING STATIC AND DYNAMIC APPLICATION SECURITY TESTING RESULTS FOR A WEB AND MOBILE APPLICATION

CROSS REFERENCES TO RELATED APPLICATIONS

This application claims the benefit of, and priority to, U.S. patent application Ser. No. 15/011,817 filed Feb. 1, 2016 which claims benefit of, and priority to U.S. provisional application Ser. No. 62/117,670, filed Feb. 18, 2015, and U.S. provisional application Ser. No. 62/110,117, filed Jan. 30, 2015. Each of these applications are incorporated by reference herein.

FEDERALLY-SPONSORED RESEARCH

This invention was made with government support under Contract No. HSHQDC-13-C-00038 awarded by the Department of Homeland Security. The government has certain rights in this invention.

BACKGROUND OF THE INVENTION

1. Field of the Invention

This invention relates generally to application security. More specifically, this invention relates to a method of merging and correlating results from static and dynamic application security testing of web and mobile applications.

2. Description of the Related Art

The modern world runs on information technology, and information technology is powered by software. Software is a vital component of how governments and organizations provide basic services like power and water, and provides the communication networks underpinning modern life. Disruptions of these systems can result in significant hardship and even loss of life.

Unfortunately, most software is plagued with serious vulnerabilities. According to one report, on average, 79 vulnerabilities are found in a typical website during a year. Only 63% of these vulnerabilities are ever remediated, and the average time to fix for a vulnerability is 38 days. This results in an average window of exposure of 231 days.

The ongoing proliferation of websites, web applications, and mobile applications that deal with sensitive data makes this problem even more challenging, because many organizations find that their application portfolio is ever-expanding. This trend forces organizations to deal with the problem of the scale of their software portfolios if the problem is to be addressed in an economically viable manner.

There are two leading classes of tools used to conduct automated security testing: static analysis tools and dynamic analysis tools. Static analysis tools look at software artifacts (such as source code or binaries) "at rest." These tools analyze program structure, control flow, data flow, and semantics and apply different rules and pattern mapping to identify potential security vulnerabilities. Static analysis tools provide a code-level view of the application and its security state.

On the other hand, dynamic analysis tools look at a running instance of the web or mobile application software, map out the structure of the application as observed from the outside in a way similar to a legitimate user navigating the application, and then attempt to send malformed requests or inputs to the application. A dynamic scanner then analyzes the request and response traffic and applies pattern-mapping to identify interactions that reflect an application vulnerability.

Both types of analysis tools have strengths and weaknesses, and some are better at finding certain classes of vulnerabilities than others. Static analysis tools provide a systems-level view of vulnerabilities. Because they work at a code level, they can provide specific information about the location of vulnerabilities, which can be beneficial for software programmers looking to implement source code changes that address identified security issues. However, static analysis tools can be prone to false positives because they do not have full knowledge of how the final running system will behave.

On the other hand, dynamic analysis tools differ by providing an architectural and threat view of vulnerabilities. This outside-in view of the vulnerabilities typically requires additional analysis before the required location of code-level changes is known. Their findings are based on observations of a running system so they can help to reduce false positives by reflecting the "ground truth" of the system's behavior. With that said, some degree of false positives should be expected from any automated assessment tool.

Applications can become quite large, so dealing with the vulnerability data resulting from scans is a significant issue. Running multiple types of software analysis can be valuable to both find more vulnerabilities as well as reveal more data about previously identified vulnerabilities. Increased data can be valuable when it provides deeper insight into vulnerabilities; however, increased data can also be of lesser value when it makes the overall problem harder to manage by requiring too much manual analyst review or highlighting large numbers of potential vulnerabilities and weaknesses that are of low value or priority.

Currently, there is no easy and/or reliable way to correlate results from static analysis tools with results from dynamic analysis tools. This "deficiency" in the art may lead to misinterpreting reports by identifying two distinct vulnerabilities—one from static findings, one from dynamic findings—when really only one vulnerability exists. Also, correlations between static and dynamic testing results may not be taken into account when determining the priority by which vulnerabilities need to be addressed.

BRIEF SUMMARY

The invention provides a method of merging and correlating results from static application security testing (SAST) and dynamic application security testing (DAST) of web and mobile applications. This improves the ability of the application development team to identify vulnerabilities identified by both types of testing tools and prioritize the vulnerabilities to be addressed. In addition, the invention provides the ability to map the location of a dynamic vulnerability finding to a specific line of code, including within the Integrated Development Environment (IDE) tools used by development teams. Moreover, the invention provides the capability to "seed" a dynamic scanner with an exhaustive list of all URLs and parameters or other attack surface that should exist in an application. This allows the scanner to perform more exhaustive testing than if it was required to discover or guess the list of URLs and parameters and other attack surface based solely on a blind dynamic analysis of the application's attack surface.

Applicant refers to the process described herein as Hybrid Analysis Mapping, or HAM.

DETAILED DESCRIPTION OF CERTAIN EMBODIMENTS

Figure 1:
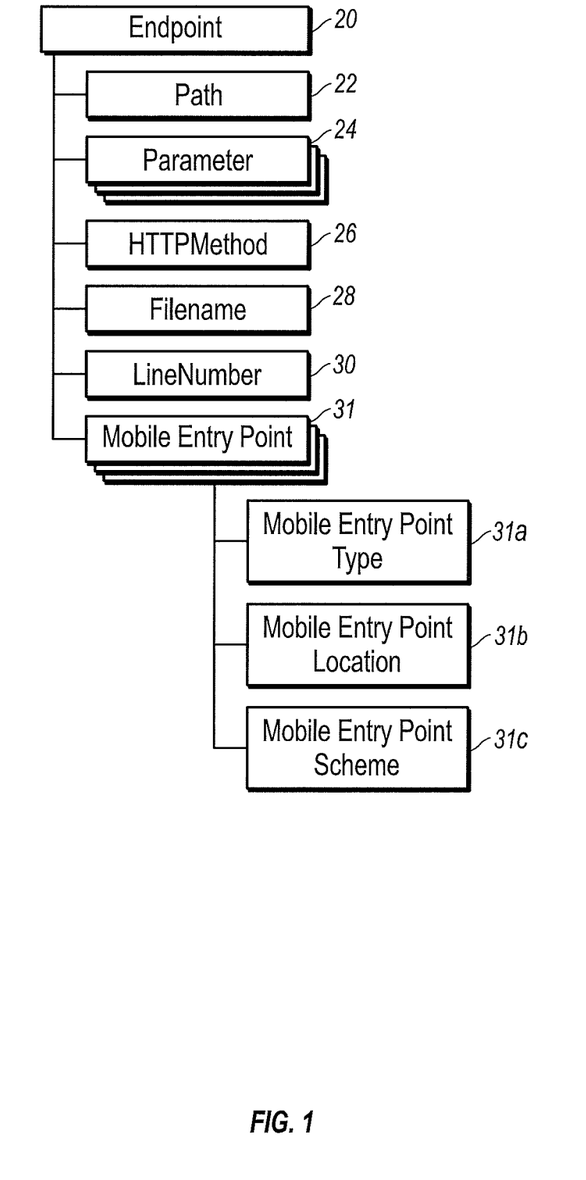
FIG. 1 shows the Endpoint object of the invention.

Referring to FIG. 1, the invention involves the creation and use of an Endpoint database that may contain Endpoint objects 20. Each Endpoint object 20 represents a space on the subject application's attack surface and includes a path 22 (i.e., location within the application's attack surface), one or more parameters 24, an HTTPMethod 26, a filename on the file system 28, line number 30, and mobile entry point 31 further comprising mobile entry point type 31a, mobile entry point location 31b, and scheme 31c. Any Endpoint object 20 includes at least one of these properties to be populated, but does not require that all properties be populated.

Figure 2:
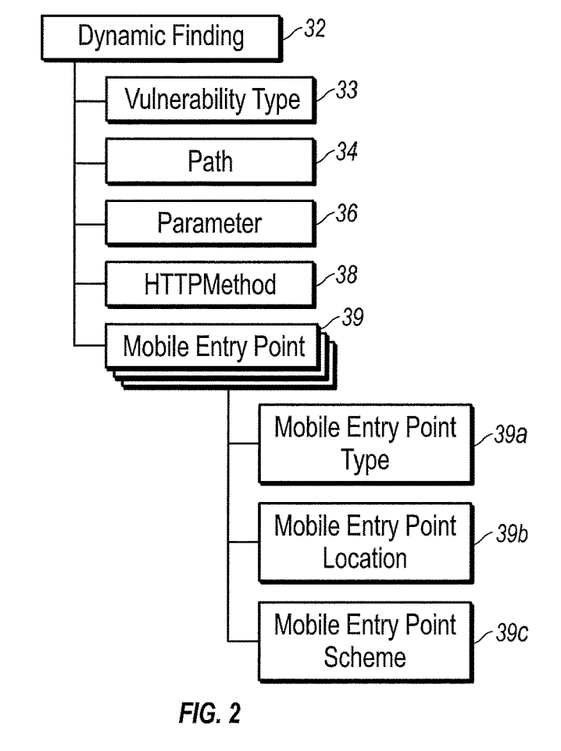
FIG. 2 shows a Dynamic Finding data structure.

FIG. 2 shows a typical Dynamic Finding object 32 that may be returned by a dynamic scanner. The Dynamic Finding object 32 includes a vulnerability type (preferably using the MITRE CWE taxonomy) object 33, a path object 34, a parameter object 36, an HTTPMethod object 38, and mobile entry point 39 further comprising mobile entry point type 39a, mobile entry point location 39b, and scheme 39c associated with a detected vulnerability. Any Dynamic Finding object 32 includes as at least one of these properties to be populated, but does not require that all properties be populated.

Figure 3:
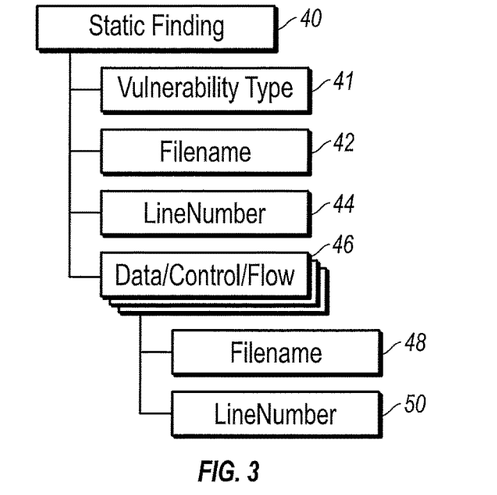
FIG. 3 shows a Static Finding data structure.

FIG. 3 shows a typical Static Finding object 40 that may be returned by a static scanner. The Static Finding object 40 includes a vulnerability type object 41, a filename object 42, line number object 44, and one or more control/data flow objects 46 associated with a detected vulnerability. Each control/data flow object 46 contains a code filename 48 and line number of executed code 50.

Figure 4A:
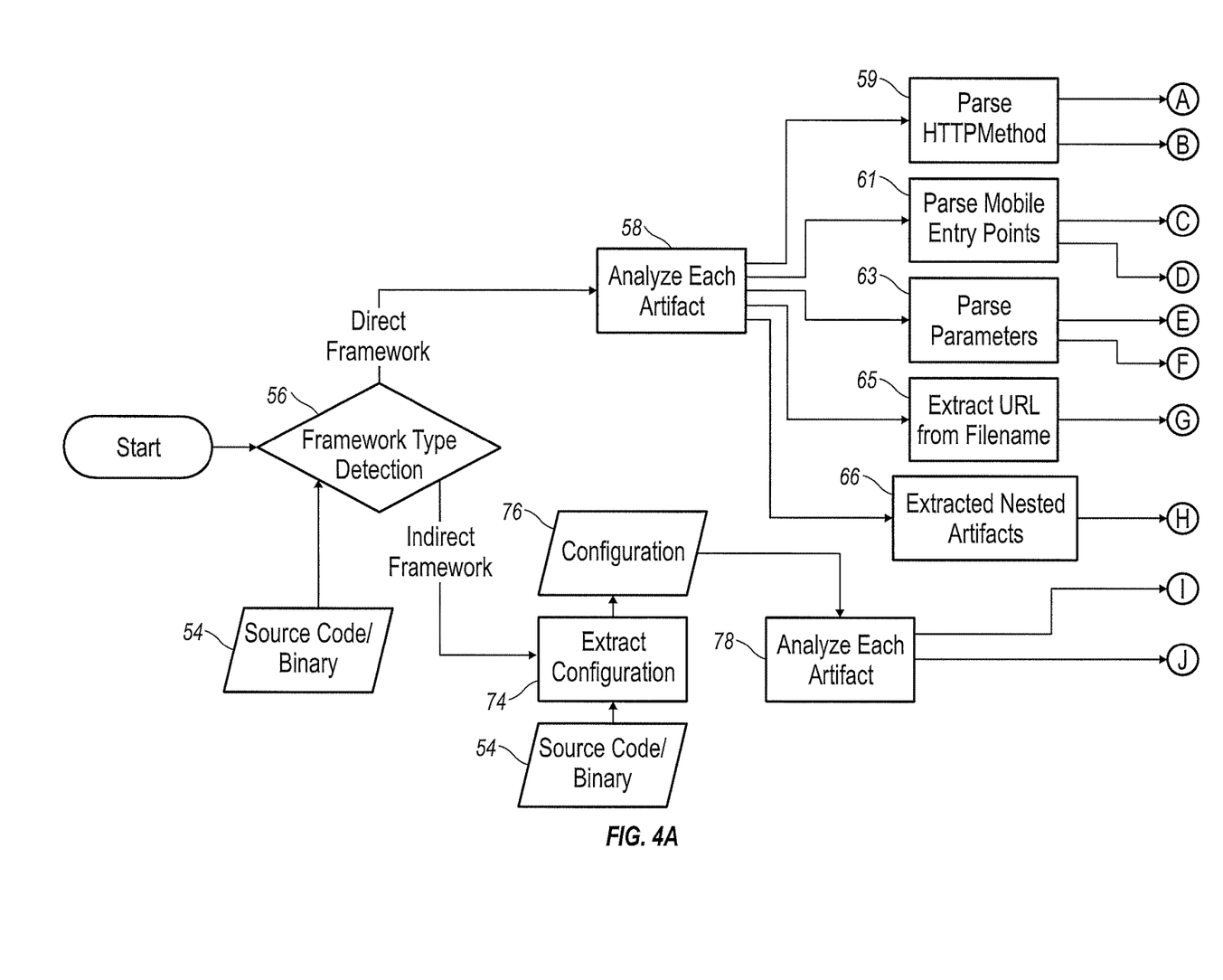
FIGS. 4A and 4B together show a process of creating an Endpoint object database.
Figure 4B:
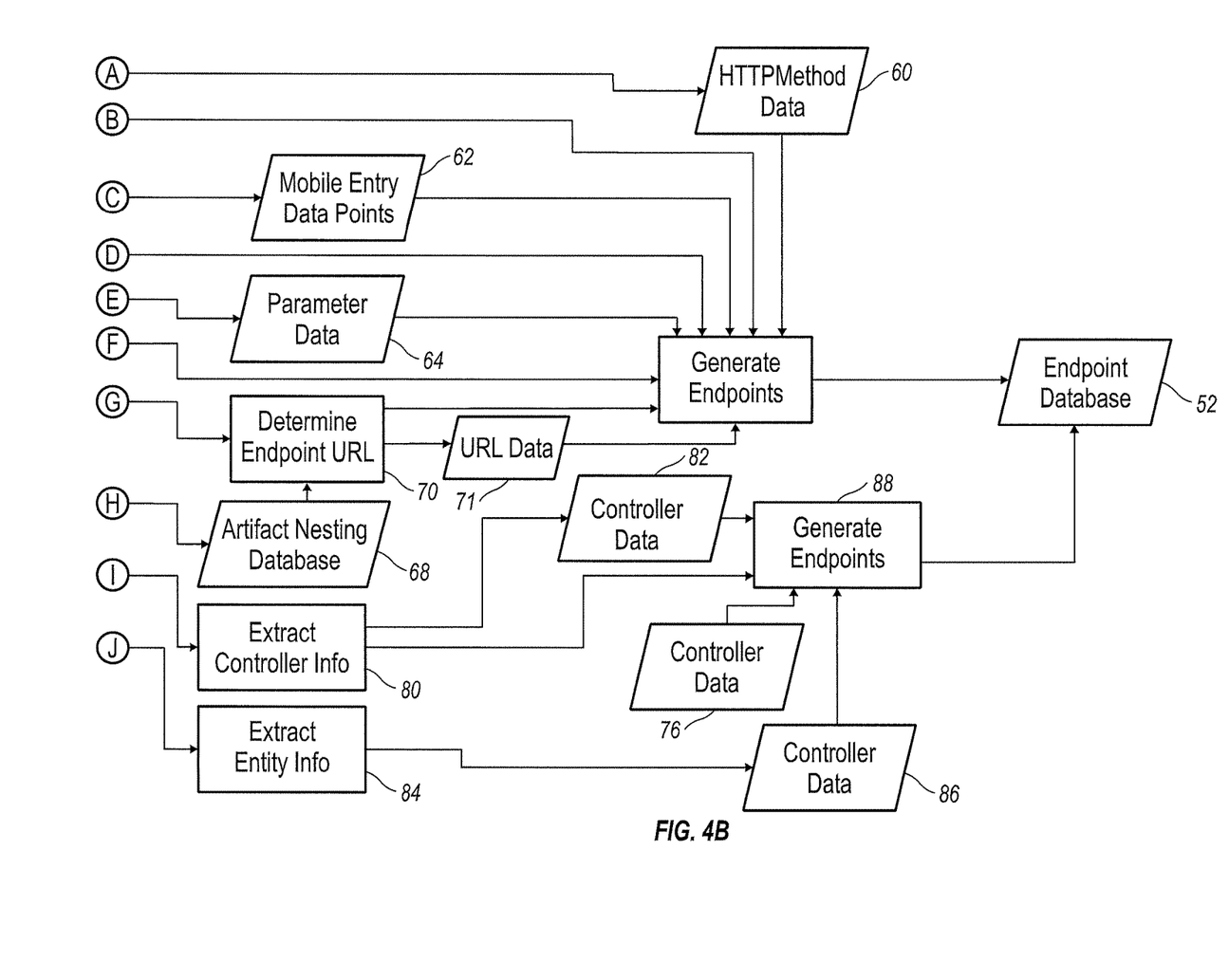

FIGS. 4A-4B show the process of creating an Endpoint Database 52 containing one or more Endpoint objects and using code files 54 of the application. The code files 54 may be source code or binary code.

Each application is developed from a web or mobile application framework designed to support the development of dynamic websites, web applications, web services, web resources, or mobile applications. In step 56, the application's framework is analyzed to determine whether it is a "direct" or "indirect" framework. As used herein, "direct" frameworks are frameworks with well-defined rules for structuring an application and which generally have a rigid configuration. For example, a basic Java application using JSP is an example of a direct framework and most mobile applications have common patterns for mapping source code and configuration artifacts to dynamic application behavior. In contrast, an "indirect" framework uses conventions rather than a rigid configuration for knowing where to access the necessary files, which provides more flexibility to the programmer. One example of an indirect framework is Spring MVC, which is an open source framework for the Java platform.

Identifying whether the framework is "direct" or "indirect" during the process requires prior classification of the various frameworks as "direct" or "indirect," and then looking for characteristics uniquely or strongly associated with a specific framework. For example, after having classified Spring as an indirect framework, characteristics unique or common to the Spring framework (e.g., Spring-specific file names, extensions, or controllers) can be detected using a code parser. If the parser detects Spring-specific characteristics, the process knows it is dealing with an indirect framework and to expect, for example, controller artifacts and entity artifacts that contain parameters found on the attack surface of the application. Ex. A, pages 4-7 shows an example of a framework checker for integrating the process with Spring MVC.

If step 56 identifies a direct framework, in step 58, a source code parser extracts each "artifact," including any nested artifacts, on the file system. As used herein, an "artifact" is a source code file, configuration file, or binary code file.

In step 59, any HTTPMethod objects are parsed from the artifacts to generate HTTPMethod data 60. In step 61, mobile entry points are parsed from the artifacts to generate Mobile Entry Point Data 62 to include mobile entry point type (i.e. Android Intents, iOS or Android URL scheme handlers), mobile entry point location, and schemes. In step 63, any HTTP parameters are parsed from the artifacts to generate parameter data 64. In step 65, the process extracts any URLs (i.e., path information) from each artifact and generates URL Data 71. In step 66, any nested artifacts are extracted and placed in an artifact nesting database 68. From the extracted URLs from step 65 and the artifact nesting database 68, step 70 determines the endpoint URLs. In step 70, endpoints are generated and populated with the HTTP-Method data 62, parameter data 64, and the URLs. Step 72 generates the Endpoint objects for the Endpoint Database 52. Alternative embodiments of the process may simply assume the existence of the GET and POST HTTPMethods without the parsing 59.

Referring back to step 56, if an indirect framework like Spring is detected, step 74 determines the configuration 76 of the application based on the code files 54. The "configuration" means the location (i.e., path and filename) of each artifact of the application. (In contrast, in a direct framework, the configuration is known as a result of the framework itself. Thus, there is no extraction step when the process operates on a direct framework.)

In step 78, the process analyzes each artifact to identify entity information and controller information. In the model-view-controller architectural pattern, the controller is the software component of an application built in an indirect framework that sends commands to the model to update the model's state. An example of a controller may be a "check-out controller" on an e-commerce site that processes a credit card transaction for payment.

Because control artifacts have references to entities, and entities have information about parameters the process retrieves the HTTPMethods and parameters by parsing control artifacts and entity artifacts. In step 80, for example, the process extracts the controller information into controller data 82. In step 84, the process extracts the entity information into entity data 86. In step 86, the configuration 76, controller data 82, and entity data 84 are used to generate Endpoint objects in the Endpoint database 52.

Figure 5A:
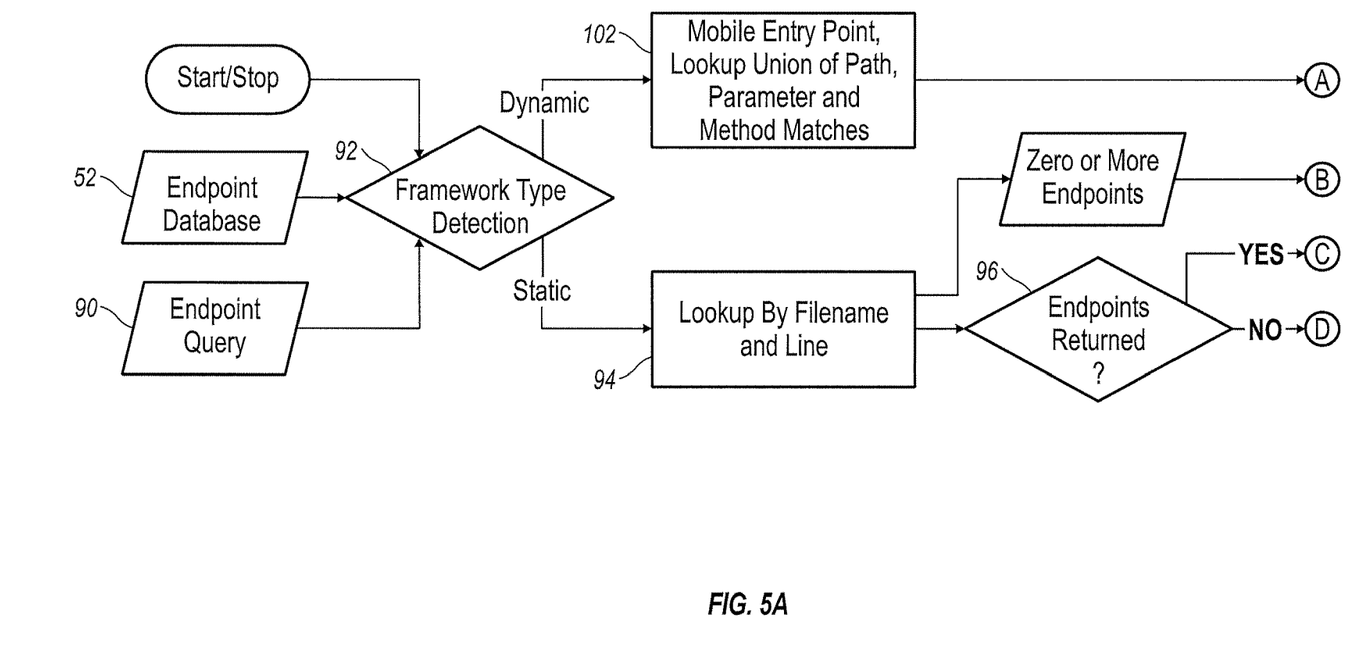
FIGS. 5A and 5B together show a process of looking up an Endpoint in the database.
Figure 5B:
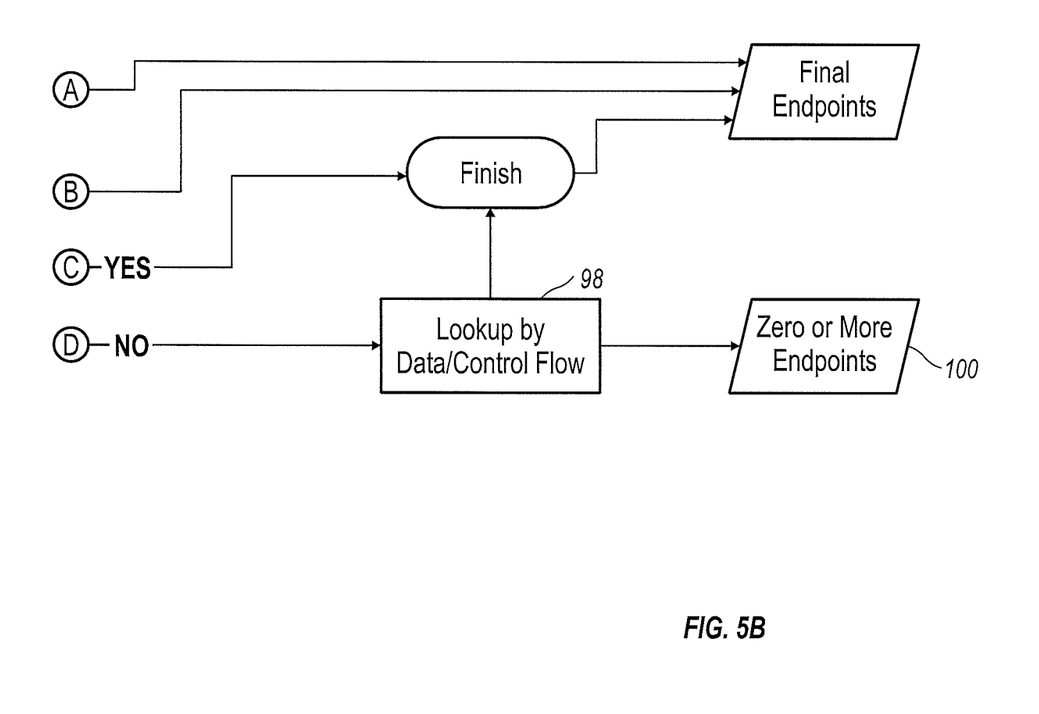

FIGS. 5A-5B show the process of looking up an Endpoint object in the Endpoint Database 52 based on an Endpoint Query 90. The Endpoint Query 90 includes information associated with either a static test result (filename, line number) or a dynamic test result (path, parameter, HTTP-Method, and mobile entry point).

In step 92, the process determines whether the Endpoint Query is looking for an Endpoint object associated with static or dynamic test results based on the parameters passed by the Endpoint Query 90. If the Endpoint Query 90 is looking for an Endpoint "static" result, in step 94 the process searches for all Endpoint objects associated with the filename and line number in the query. If only one Endpoint object is returned, the process is finished. In step 96, if more than one Endpoint object is returned (i.e., such as in the case the framework was determined to be an indirect framework), the Data/Control Flow parameter 46 (see FIG. 3) is used (step 98) to search the Endpoint database and return any matching Endpoint objects (step 100) based on dataflow. As used herein, "Data/Control Flow" means every point in the code that a request touches as it executes.

If the Endpoint Query 90 contains information associated with a dynamic test result, step 102 looks up the union of the path, parameter, HTTPMethod, and mobile entry point objects and returns the associated Endpoint object.

Figure 6A:
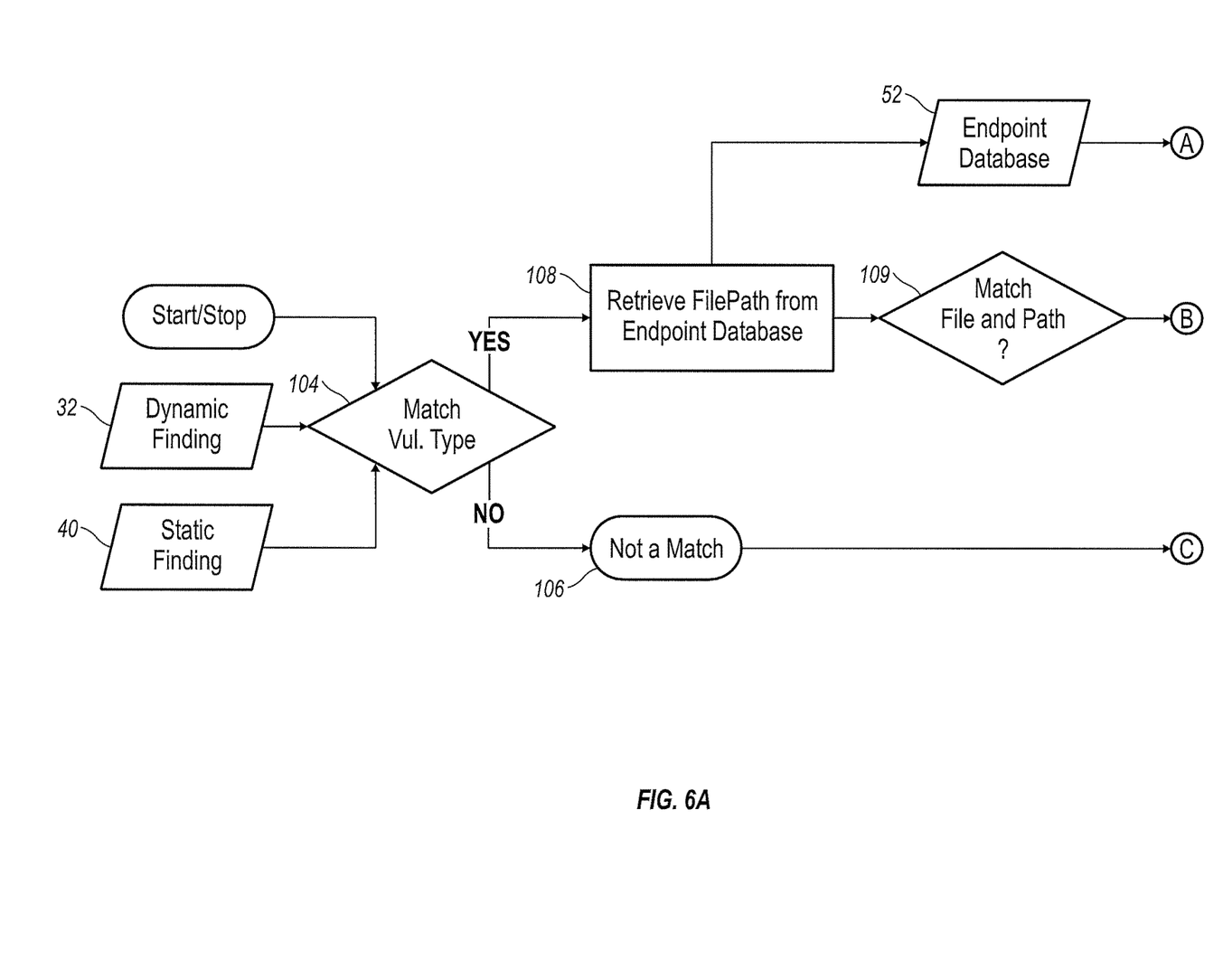
FIGS. 6A and 6B together show a process of merging dynamic testing results and static testing results.
Figure 6B:
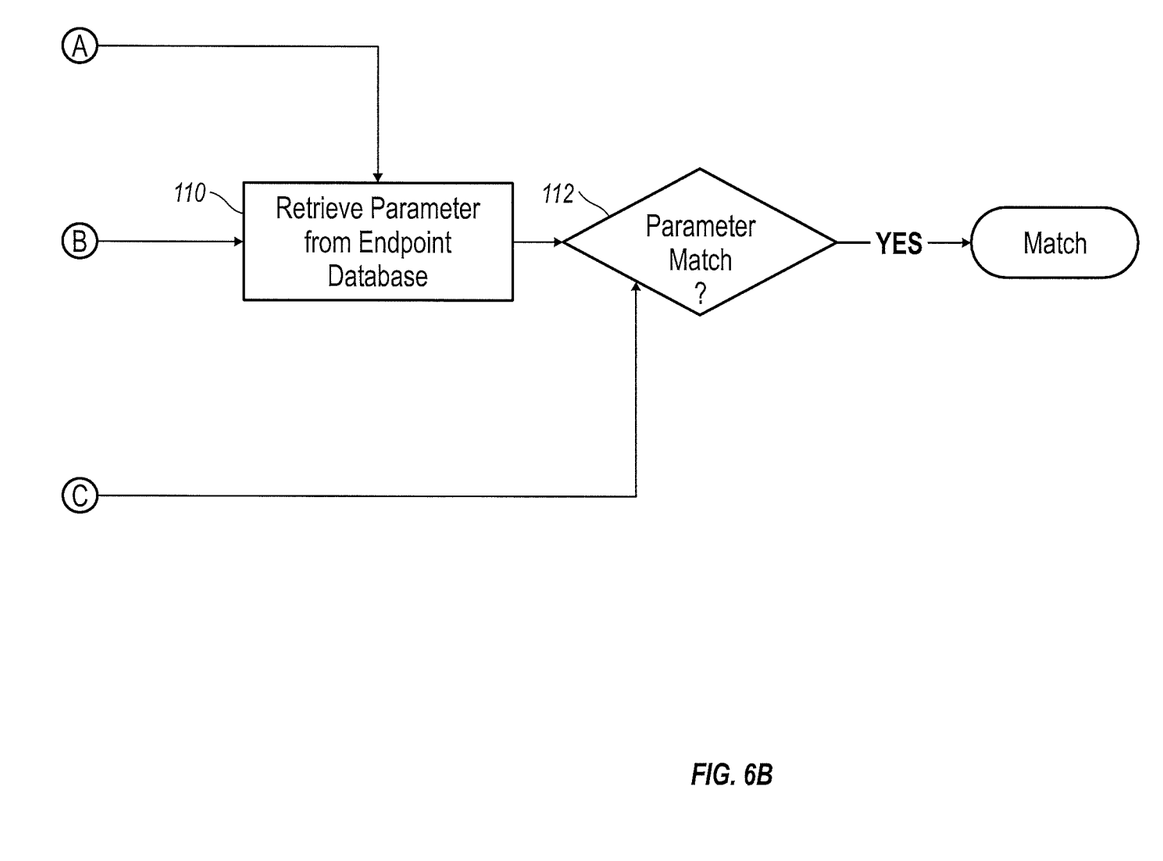

FIGS. 6A-6B show the process of first matching and then merging the static and dynamic test results. The inputs are the dynamic findings 32 and static findings 40 (see FIGS. 2-3) returned from dynamic and static testing, respectively. The process attempts to match dynamic findings and static findings on three points of data. First, in step 104, the process compares the vulnerability types (e.g., SQL injection, cross-site scripting) of the two findings 32, 40. If the vulnerability types are not the same, there is no match (step 106) and the process ends. If the vulnerability types are the same, the process proceeds to step 108. In the preferred embodiment, the comparison is made using the Common Weakness Enumeration (CWE) standard taxonomy to classify vulnerabilities.

In step 108, the process retrieves the file and path locations for the Dynamic Finding 32 from the Endpoint Database 52. If the file and path location match the location of the Static Finding 40 (step 109), the process moves to the next step 110. Otherwise, the process terminates without a match (step 106).

In step 110, the process retrieves the parameter objects associated with the Dynamic Finding 32. If the parameter objects match, the process returns the output of a match (step 112) between the Dynamic Finding 32 and Static Finding 40. The Endpoint object may then be updated with any missing information.

One advantage of the merging static and dynamic findings relates to mapping dynamic vulnerabilities to locations in code, which can then be mapped to the developer's IDE. Mapping static findings is easy because they include the location of the vulnerability, which are passed to the IDE. In fact, most static scanners already have plugins for popular IDEs. Dynamic scanners, however, do not have access to source code file name information. Thus, after creation of the Endpoint Database 52, the location of each dynamic finding can be retrieved and passed to the IDE for mapping to the specific lines of code where the vulnerabilities appear.

Figure 7:
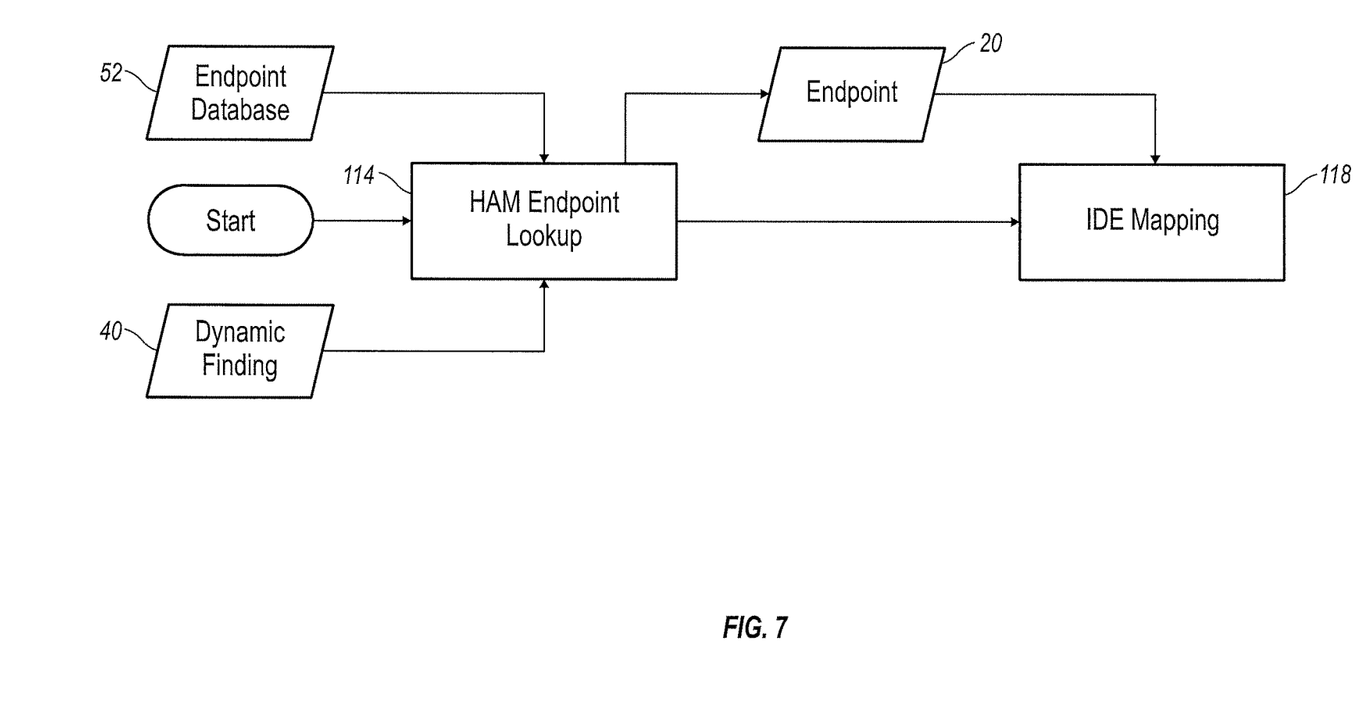
FIG. 7 shows a process of mapping a dynamic testing results result to a line of code.

Referring to FIG. 7, the inputs into the process are the Endpoint Database 52 and the Dynamic Finding 32. In step 114, an Endpoint object 20 associated with the Dynamic Finding 32 is looked up in the Endpoint Database 52 as described with reference to FIGS. 5A-5B. The location information of the Endpoint object is then passed to the IDE in step 118 and mapped.

Figure 8:
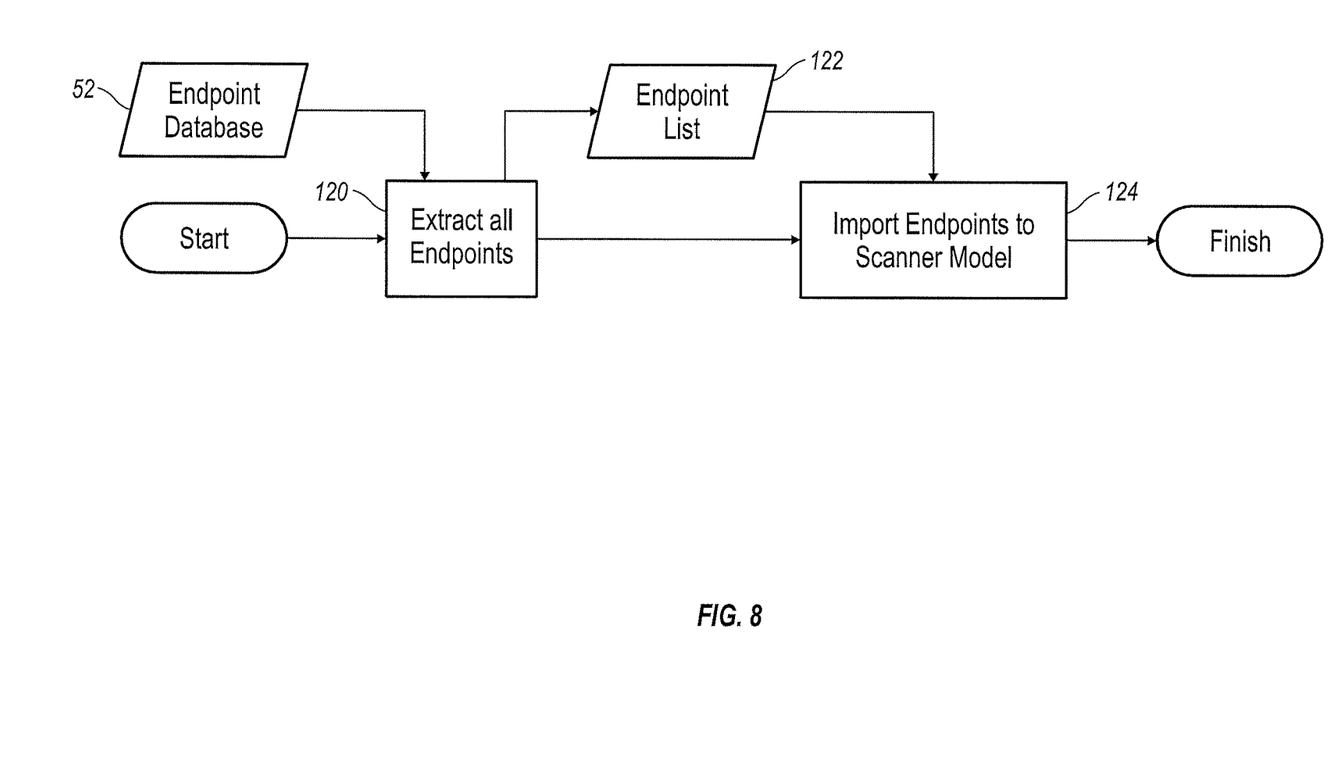
FIG. 8 shows a method of dynamic scanner seeding using the Endpoint Database.

As shown in FIG. 8, another advantage is using the information contained in the Endpoint Database 52 to "seed" a dynamic scanner. Typically, scanners will "spider" the application or simply guess about URLs that might be exposed as well as parameters that can be passed in or undertake other methods to map out an application's attack surface. This may lead to some pages and parameters or other attack surface points being missed during dynamic testing because of weaknesses in the spider, the existence of pages without inbound links, parameters that do not appear in web pages rendered during the spidering process, or other weaknesses in the attack surface calculation process. By analyzing the Endpoint Database 52, the Endpoint objects may be extracted (step 120) to an exhaustive list 122 of all URLs and parameters and other attack surface points, which may then be imported (step 124) into the scanner. The scanner can then perform more thorough analysis of the target web or mobile application and potentially identify vulnerabilities it should have identified, but did not based on an inferior, non-seeded attack surface model. This helps the security-testing team more thoroughly test the application and identify vulnerabilities that might otherwise be missed.

The present invention is described in terms of specifically-described embodiments. Those skilled in the art will recognize that other embodiments of such methods can be used in carrying out the present invention. Other aspects and advantages of the present invention may be obtained from a study of this disclosure and the drawings, along with any claims.

The invention claimed is:

1. A method of correlating a static application security testing (SAST) finding and a dynamic application security testing (DAST) finding to analyze at least one vulnerability of an application having a plurality of lines of code, wherein a single line of code is associated with a filename and a line number, the method comprising:
    creating an endpoint database comprising at least one endpoint object having a filename property and line number property associated with at least one of the following:
        one or more path properties,
        one or more parameter data properties,
        one or more HTTPMethod data properties,
        and one or more mobile entry point properties;
    classifying the lines of code as a direct or indirect application framework based on predetermined characteristics;
    if the framework is classified as direct, then
        parsing HTTP parameters from at least one single line of code to generate parameter data, determining a path based on the filename associated with the at least one single line of code, and generating at least one endpoint object with the parameter data, the line number associated with the at least one single line of code, the filename associated with the at least one single line of code, and the path;
        parsing mobile entry points from at least one single line of code to generate mobile entry point data, determining a path based on the filename associated with the at least one single line of code, and generating at least one endpoint object with the mobile entry point data, the line number associated with the at least one single line of code, the filename associated with the at least one single line of code, and the path; and generating at least one endpoint object for each filename with HTTPMethod data and the filename;

if the framework is classified as indirect, then
identifying entity information and controller information associated with at least one single line of code;
parsing the entity information and the controller information to generate parameter data and path data and generating at least one endpoint object with the parameter data, the line number associated with the at least one single line of code, the filename associated with the at least one single line of code, and the path; and
parsing the entity information and controller information to generate HTTPMethod data and path data and generating at least one endpoint object with the HTTPMethod data, the line number associated with the at least one single line of code, the filename associated with the at least one single line of code, and the path;
searching the endpoint database for an endpoint object associated with SAST or DAST results based on search parameters passed by an endpoint query, wherein the search parameters include a SAST finding or a DAST finding;
matching the SAST finding and the DASTfinding; and
merging the SAST finding and the DASTfindings to analyze the at least one vulnerability of the application.

2. The method of claim 1 wherein the searching step comprises the steps of:
determining if the search parameters include a filename and line number;
if the search parameters include a filename and line number, returning all endpoint objects in the endpoint database associated with the filename and line number and, if more than one endpoint object is returned, searching a data/control flow parameter of the SAST result to locate the endpoint object;
if the search parameters do not include a filename and line number, returning a endpoint object having the mobile entry point, the path, parameter, and HTTPMethod objects of the DAST finding.

3. The method of claim 2 wherein the matching step comprises:
comparing the vulnerability types of the SAST finding and the DAST finding;
if the vulnerability types are the same, retrieving the file and path locations of the DAST finding from the endpoint database;
comparing the retrieved file and path location of the DAST finding to the file and path location of the SAST finding for a match;
if the file and path location of the DAST finding match the file and path location of the SAST finding, updating the endpoint object with the SAST finding.

4. The method of claim 1 wherein the mobile entry point data further comprises mobile entry point type, mobile entry point location, and scheme.

5. A computer implemented method of creating a virtual attack surface of an application for use in analyzing the application's vulnerabilities from a code having a plurality of lines, wherein a single line of code is associated with a filename and a line number, the method comprising:

creating an endpoint database for use in analyzing the application's vulnerabilities comprising at least one endpoint object having a filename property and line number property associated with at least one of the following:
one or more path properties,
one or more parameter data properties, and
one or more HTTPMethod data properties; and
one or more mobile entry point properties;
classifying the code as a direct or indirect application framework based on predetermined characteristics;
if the framework is classified as direct, then
parsing HTTP parameters from at least one single line of code to generate parameter data, determining a path based on the filename associated with the at least one single line of code, and generating, in the endpoint database, at least one endpoint object with the parameter data, the line number associated with the at least one single line of code, the filename associated with the at least one single line of code, and the path;
parsing mobile entry points from at least one single line of code to generate mobile entry point data, determining a path based on the filename associated with the at least one single line of code, and generating, in the endpoint database, at least one endpoint object with the mobile entry point data, the line number associated with the at least one single line of code, the filename associated with the at least one single line of code, and the path; and
generating, in the endpoint database, at least one endpoint object for each filename with HTTPMethod data and the filename;
if the framework is classified as indirect, then
identifying entity information and controller information associated with at least one single line of code;
parsing the entity information and the controller information to generate parameter data and path data and generating, in the endpoint database, at least one endpoint object with the parameter data, the line number associated with the at least one single line of code, the filename associated with the at least one single line of code, and the path; and
parsing the entity information and controller information to generate HTTPMethod data and path data and generating, in the endpoint database, at least one endpoint object with the HTTPMethod data, the line number associated with the at least one single line of code, the filename associated with the at least one single line of code, and the path.

6. The method of claim 5 wherein the predetermined characteristics comprise file names, extensions or controllers unique to an application framework.

7. The method of claim 5 further comprising the step of, if the framework is classified as direct, parsing HTTP method objects from at least one single line of code to generate HTTPMethod data, determining a path based on the filename associated with the at least one single line of code, and generating at least one endpoint object with the HTTPMethod data, the line number associated with the at least one single line of code, the filename associated with the at least one single line of code, and the path.

8. The method of claim 5 further comprising the steps of:
accessing a plurality of dynamic application security testing (DAST) findings created from a dynamic scanner of the application wherein each of the plurality of DAST findings comprise a DAST path associated with at least one of a DAST vulnerability type, DAST HTTPMethod, or DAST parameter;

for each one of the plurality of DAST findings, searching the endpoint database with the DAST path, DAST HTTPMethod, and DAST parameter associated with the one of the plurality of DAST findings;

associating the one of the plurality of DAST findings with the endpoint object if:

the DAST path and the path of each endpoint object for a match;

the DAST HTTPMethod and the HTTPMethod data of each endpoint object for a match; or the DAST parameters and the parameter data of each endpoint object for a match.

9. The method of claim 8 wherein the searching step comprises the steps of:

determining if the search parameters include a filename and line number;

if the search includes a filename and line number, returning all endpoint objects in the endpoint database associated with the filename and line number and, if more than one endpoint object is returned, searching the parameters of the DAST finding to locate the endpoint object.

10. The method of claim 5 further comprising the steps of:

extracting the path and parameters from each endpoint object and seeding the extracted path and parameters into a dynamic scanner.

11. The method of claim 5 further comprising the steps of:

accessing a plurality of dynamic application security testing (DAST) findings created from a dynamic scanner of the application wherein each of the plurality of DAST findings comprise a DAST path associated with at least one of a DAST vulnerability type, DAST HTTPMethod, or DAST parameter;

accessing a plurality of static application security testing (SAST) findings created from a static scanner of the application wherein each of the plurality of SAST findings comprise a SAST vulnerability type associated with a SAST filename and SAST line number;

for each one of the plurality of DAST findings, comparing the DAST vulnerability type associated with the one of the plurality of DAST findings with the SAST vulnerability type associated with each of the plurality of SAST findings;

if there is a match, then comparing the path and filename of the endpoint object associated with the one of the plurality of DAST findings associated with the DAST vulnerability type with the filename of the one of the plurality of SAST findings associated with the SAST vulnerability type;

if there is a match, then comparing the parameter of the endpoint object associated with the one of the plurality of DAST findings associated with the DAST vulnerability type with the parameter of the one of the plurality of DAST findings associated with the DAST vulnerability type;

if there is a match, then updating the endpoint object associated with the one of the plurality of DAST findings with the information identified in the matched one of the one of the plurality of SAST findings associated with the SAST vulnerability type.

12. The method of claim 5 wherein the mobile entry point data further comprises mobile entry point type, mobile entry point location, and scheme.

* * * * *